US009154425B2

(12) United States Patent
Iny et al.

(10) Patent No.: US 9,154,425 B2
(45) Date of Patent: *Oct. 6, 2015

(54) METHOD AND APPARATUS FOR ROUTING IN A SINGLE TIER SWITCHED NETWORK

(71) Applicant: Broadcom Corporation, Irvine, CA (US)

(72) Inventors: Ofer Iny, Tel Aviv (IL); Eyal Dagan, Zichron Ya'akov (IL); Golan Schzukin, Herzliya (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,672

(22) Filed: Jan. 24, 2014

(65) Prior Publication Data

US 2014/0140214 A1    May 22, 2014

Related U.S. Application Data

(63) Continuation of application No. 13/041,507, filed on Mar. 7, 2011, now Pat. No. 8,705,544.

(51) Int. Cl.
*H04L 12/28* (2006.01)
*H04L 12/803* (2013.01)
(Continued)

(52) U.S. Cl.
CPC .............. *H04L 47/125* (2013.01); *H04L 45/44* (2013.01); *H04L 45/74* (2013.01); *H04L 47/527* (2013.01); *H04L 49/1515* (2013.01); *H04L 49/25* (2013.01); *H04L 49/3009* (2013.01)

(58) Field of Classification Search
USPC .......................................... 370/401, 352, 392
See application file for complete search history.

(56) References Cited

U.S. PATENT DOCUMENTS 5,519,707 A    5/1996 Subramanian et al.
5,528,586 A *  6/1996 Ebert et al. ..................... 370/419

(Continued)

FOREIGN PATENT DOCUMENTS

EP       2134037      12/2009
WO    WO9704546       2/1997

(Continued)

OTHER PUBLICATIONS

European Search Report for Application No. 12001072, Jun. 15, 2012.

(Continued)

*Primary Examiner* — Hassan Phillips
*Assistant Examiner* — Siren Wei
(74) *Attorney, Agent, or Firm* — Oblon, McClelland, Maier & Neustadt, L.L.P.

(57) ABSTRACT

A method and apparatus for more efficient routing of packets in a network is provided. The apparatus may include dynamic routing of packets or portions of packets which avoids congestion and blocking by making local decisions within the network. The apparatus may further include creating and updating routing tables which map switch outputs to available network output ports. Additionally the header of packets entering the network are processed prior to entry or as part of the entry to the network to produce a processed packet. The processed packets or portions of packets preferably include complete route information or a final destination address that enables rapid routing through the network without further processing of the packet header. One or more aspects of the inventions may be implemented in combination with other aspects of the invention to further improve network efficiency.

20 Claims, 13 Drawing Sheets

(51) Int. Cl.
*H04L 12/933* (2013.01)
*H04L 12/947* (2013.01)
*H04L 12/935* (2013.01)
*H04L 12/721* (2013.01)
*H04L 12/741* (2013.01)
*H04L 12/873* (2013.01)

(56) References Cited

U.S. PATENT DOCUMENTS

| | | | |
|---|---|---|---|
| 5,528,591 | A | 6/1996 | Lauer |
| 6,052,375 | A * | 4/2000 | Bass et al. .................... 370/412 |
| 6,085,238 | A | 7/2000 | Yuasa et al. |
| 6,157,643 | A | 12/2000 | Ma |
| 6,640,261 | B1 | 10/2003 | Ni et al. |
| 6,876,657 | B1 | 4/2005 | Brewer et al. |
| 7,133,399 | B1 | 11/2006 | Brewer et al. |
| 7,397,794 | B1 * | 7/2008 | Lacroute et al. ............ 370/367 |
| 7,525,995 | B2 | 4/2009 | Iny |
| 7,619,970 | B2 | 11/2009 | Iny |
| 7,990,858 | B2 | 8/2011 | Iny |
| 2003/0021266 | A1 | 1/2003 | Oki et al. |
| 2003/0039250 | A1 * | 2/2003 | Nichols et al. ............... 370/394 |
| 2003/0115355 | A1 * | 6/2003 | Cometto et al. ............. 709/234 |
| 2004/0253439 | A1 | 12/2004 | Martin et al. |
| 2005/0002410 | A1 | 1/2005 | Chao et al. |
| 2005/0083839 | A1 | 4/2005 | Singh et al. |
| 2007/0248082 | A1 * | 10/2007 | Nielsen ........................ 370/360 |
| 2007/0253439 | A1 | 11/2007 | Iny |
| 2008/0031236 | A1 | 2/2008 | Yang et al. |
| 2008/0140909 | A1 | 6/2008 | Flynn et al. |
| 2008/0303628 | A1 | 12/2008 | Rojas-Cessa et al. |
| 2009/0172156 | A1 | 7/2009 | Yadav et al. |
| 2010/0061392 | A1 | 3/2010 | Iny |
| 2011/0044351 | A1 | 2/2011 | Punati et al. |

FOREIGN PATENT DOCUMENTS

| | | |
|---|---|---|
| WO | WO9955032 A1 | 10/1999 |
| WO | WO2007125527 | 11/2007 |

OTHER PUBLICATIONS

Chinese Office Action issued Jun. 6, 2014 in Chinese Application No. 201210057915.7 (no English translation), 7 pages.
Foreign Office Action from related European Application No. 12 001 072.3-1862 mailed Nov. 28, 2013.

* cited by examiner

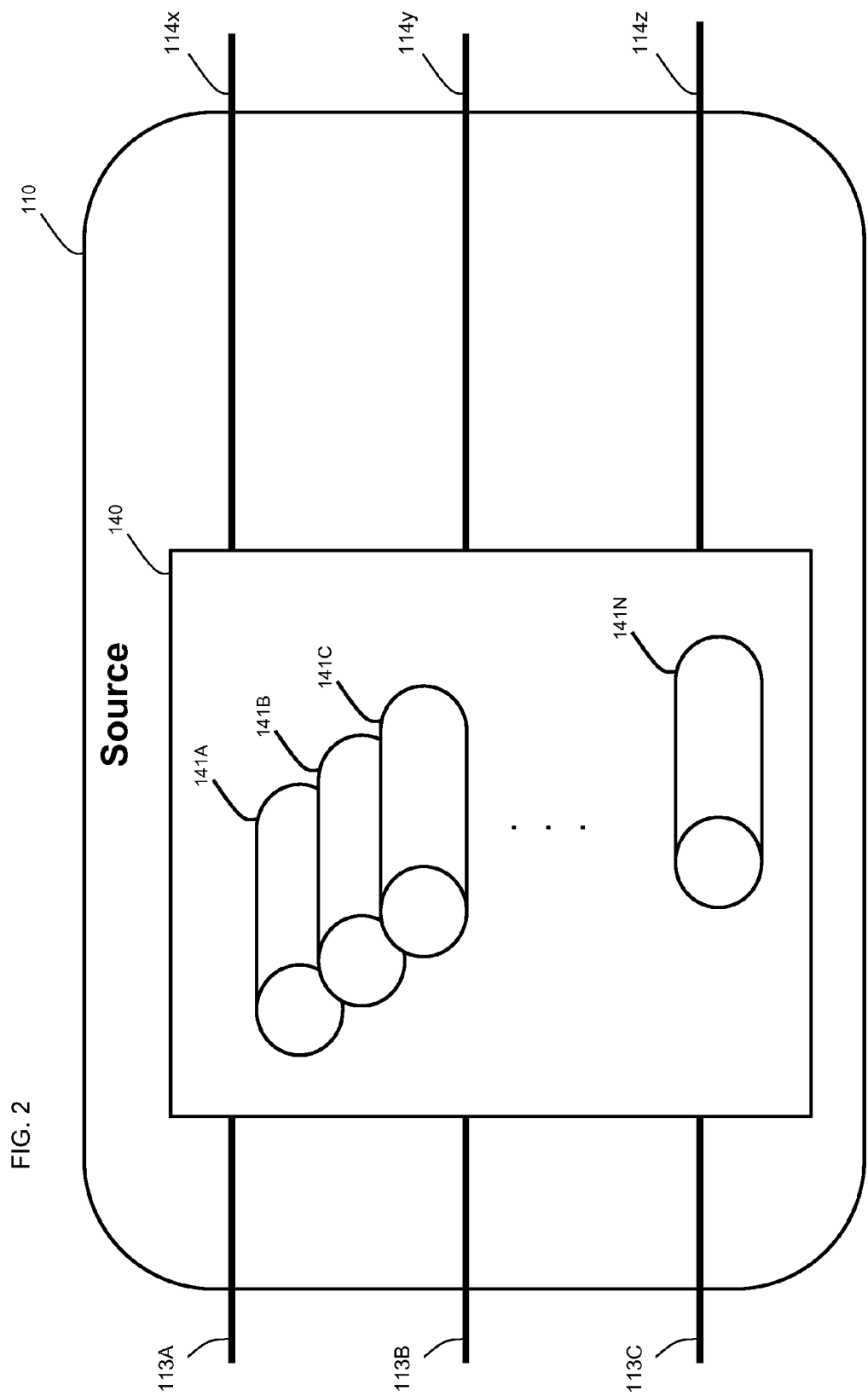

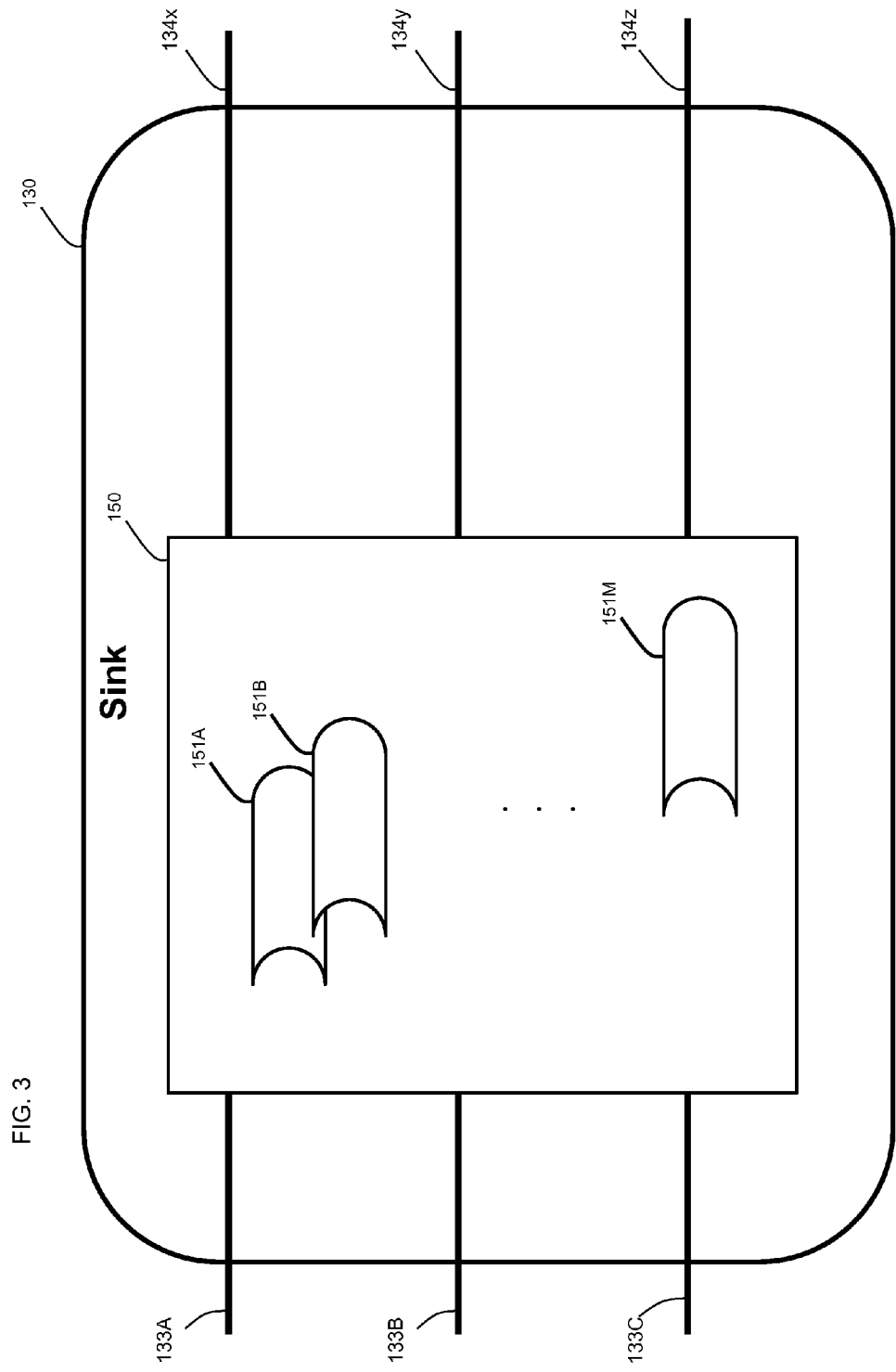

METHOD AND APPARATUS FOR ROUTING IN A SINGLE TIER SWITCHED NETWORK

CROSS-REFERENCE TO RELATED APPLICATIONS

This application is a continuation of U.S. patent application Ser. No. 13/041,507, entitled "METHOD AND APPARATUS FOR ROUTING IN A SINGLE TIER SWITCHED NETWORK," filed Mar. 7, 2011, the contents of which is hereby incorporated herein by reference in its entirety.

FIELD OF TECHNOLOGY

Aspects of the disclosure relate to providing apparatus and methods for routing of packets in a network.

BACKGROUND OF THE INVENTION

Many data networks such as computer networks or video transport networks use packet switching mechanisms to transport data. The packets are routed between entities typically referred to as nodes.

One mechanism used to transport packets between nodes is a switch which has a plurality of input ports and a plurality of output ports. Some types of switches may transport a data packet between any input port and any output port. The switch may be constructed so that any possible simultaneous combination of routes between input and output ports is feasible. Such a switch is said to be non-blocking. One type of non-blocking switch is a cross-bar switch.

When the size of the desired switch becomes larger than can be contained in single device, a number of devices may be combined to form a larger switch. When a number of switches—e.g., a cross-bar switch—are combined, the combination is referred to herein either as a fabric or a network. Like a switch, a network may be blocking or non-blocking.

An exemplary architecture for a network utilizes a plurality of devices as source switches, another plurality as sink switches and a third plurality as intermediate switches. The source switches are connected to the input ports of the network and are the source of data for the output ports of the network. The sink switches are connected to output ports of the network and act as the sink for data from the input ports of the network. Many of the links in the network may be shared by different routes which may allow a single source to block the switch by monopolizing a critical link in the network. In particular one sink or sink switch connected to the network may be overloaded with data. Typically a sink or sink switch will have a data buffer to accommodate bursts of data. However the buffer may be overloaded without some control over the incoming data.

One method of controlling the flow of data in the network is to have each source switch request bandwidth from a sink switch. The sink switch in turn generates "credits" for data bandwidth and sends these credits to the requesting source. Systems utilizing credits are known in the art and are described for instance in U.S. Pat. No. 7,619,970 which is hereby incorporated by reference herein in its entirety.

One drawback of current networks/fabrics is the possibility of blocking one route with another. Although links may be shared, certain routes may, at times, become blocked. Routing around the blocked path may be feasible, but it may require rerouting some or all of the existing routes to accommodate the blocked route. The rerouting of the flows through the network may require halting data flows in various switches, leading to unacceptable delay in data delivery to the output ports.

Another drawback of current networks is the requirement that packet headers are processed at each stage/switch in the network. Typical packets are comprised of a data section and a header section. The header is typically constructed to enable a well known protocol such as TCP/IP. At each stage/switch in the network the header is typically processed to extract routing information. This processing requirement can greatly increase the cost, memory size and processing requirements for the switches.

Yet another drawback of the current networks is the lack of information regarding the overall topology of the network. Individual switches within the network may only be aware of the original topology of the network or local connectivity. If one link in the network becomes inoperative data may be lost or delayed.

It would be desirable, therefore, to provide an apparatus and methods that prevent blocked routes in a network, reduce or eliminate packet header processing overhead at each switch and which route around damaged or inoperative links in the network.

SUMMARY OF THE INVENTION

A network comprised of switches, substantially as shown in and/or described in connection with at least one of the figures, as set forth more completely in the claims. The network may include mechanisms that prevent blocked routes. Additionally the network may reduce and/or eliminates header processing by switches within the network and routes data packets around inoperative links.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 2 shows a schematic diagram of a source device;
FIG. 3 shows a schematic diagram of sink device.

DETAILED DESCRIPTION OF THE DISCLOSURE

Apparatus and methods for improving the efficiency of a data transmission network are provided. Reduction of processing time and memory requirements for the devices that comprise the network are provided. Additionally reduced data loss and therefore improved transmission efficiency under fault conditions are also provided.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software/firmware embodiment or an embodiment combining software, firmware, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, EEPROM, Flash memory, SRAM, DRAM, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

Figure 1:
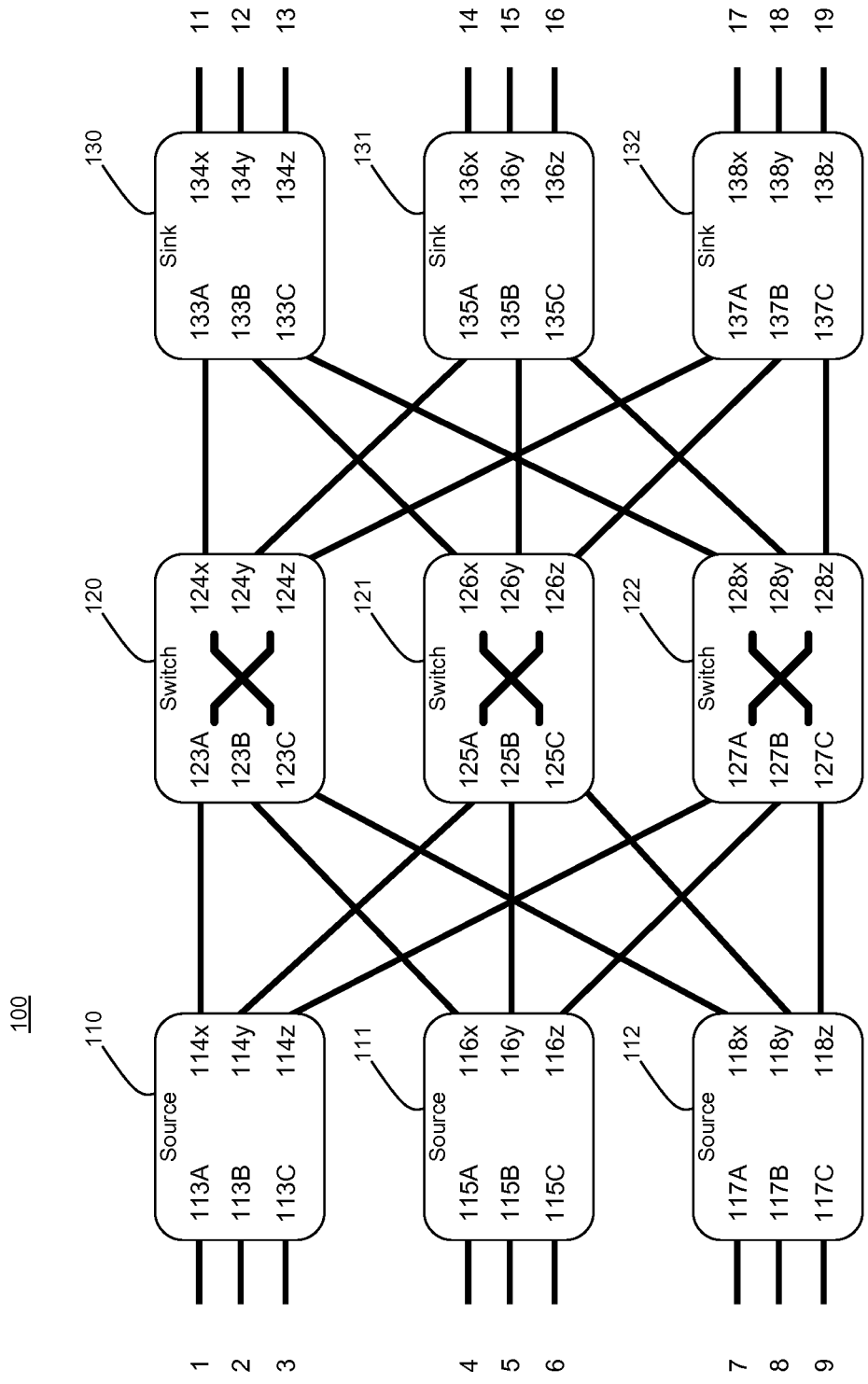
FIG. 1 shows a typical network comprised of switches.

FIG. 1 is a diagram showing an embodiment of a network 100. The network 100 is preferably comprised of layer of source switches 110, 111 and 112, a layer of intermediate switches 120, 121 and 122, and a layer of sink switches 130, 131 and 132. The network 100 has nine input ports 1-9 and nine output ports 11-19. The network 100 transports data, typically in the form of packets, or in portions of packets, from an input port to an output port. A typical use of a network 100 is the transportation of data from a disk drive connected to an input port to another disk drive connected to an output port.

The network 100 is shown as having input ports and output ports and thus supporting data flow in only one direction. However, a preferable topology would allow data to travel equally well from the nominal "output ports" to the nominal "input ports". Thus, a preferable topology allows preferably every link in the network to transport data equally in either direction. In such a preferable topology, there is no need for additional links from the sink back to the source. Thus, the same path used for transferring the data may also be used for transferring control information.

For example, if a sink 130 wants to send control information back to a source 111, it can use the links exiting the source 111. This is possible if corresponding source and sink have a separate communication channel between them. This communication channel is typically simple and local, because a corresponding source and sink may be part of the same network element. For example, sink 130 and source 111 may be part of the same network server.

Accordingly, and as will be shown in the following description, it is convenient to allow data to flow "backwards" in the system to support the transmission of control information and routing tables. Other configurations that allow data to flow in one direction or only allow high speed data movement in one direction are contemplated and included within the scope of the invention. Likewise provisions for "out of band" or separate control flow paths for control information are contemplated and included within the scope of the invention. For the sake of simplifying the description of an embodiment of network 100, only the transmission of data from the input ports to the output ports with control information flowing along the same links in the either direction will be described.

In the foregoing description each switch has several inputs and outputs connected by links to other switches and/or input/output ports of the network. In the interest of brevity the links will be described by their endpoints—e.g., the link between the output 116$z$ of source switch 111 to the input 127B of intermediate switch 122 will be described as link (116$z$, 127B). The link may also be described as link (127B, 116$z$) with no distinction being made by the use of one description or the other. A link between a network port and a switch will be described in a similar manner—e.g., the link between sink switch output 138$y$ to network output port 18 will be described as (138$y$, 18). Each link may be implemented by a known standard such as TCP/IP over Ethernet or via a proprietary method or mechanism.

Source switch 110 is connected to input ports 1, 2 and 3 via inputs 113A, 113B and 113C respectively. The link between the input ports 1-3 of the network 100 and the inputs of source switch 113A-113C may be via a known standard such as TCP/IP over Ethernet or a propriety standard. One embodiment of the input port (or output port) of the network may utilize a translation module that converts data from a known standard to a proprietary link protocol (or from a proprietary link protocol to a known standard). The translation module may be implemented as one or more line cards. Alternatively, the one or more translation modules may be configured in a "pizza box" or any other suitable implementation architecture. This architecture allows identical source switches to connect to diverse network protocols, each of which may require a distinct translation module.

In some embodiments of the invention, the network may include a server at the starting and ending point of the network. As such, the server may preferably replace either the source switch at the input of the network, the sink switch at the output of the network, or both the source switch at the input of the network and the sink switch at the output of the network. In some embodiments, a single server can act as both the source switch and the sink switch.

In another embodiment the source switch may incorporate one or more standard protocols as part of the inputs 113A-113C. In such a configuration the input port of the network 100 becomes an input of at least one source switch 110-112. In yet another embodiment several input ports of the network may be connected to a single input of a source switch via a shared medium. All such embodiments and combinations of these embodiments are contemplated and included within the scope of the invention.

The following descriptions are standardized by presuming a translation module architecture. In this architecture one card is attached to each input or output of the network. Source switches 111 and 112 are analogously connected to input ports 4-6 and 7-9 respectively.

Source switch 110 is connected to intermediate switch 120 via a link (114$x$, 123A). Source switch 110 is connected to intermediate switches 121 and 122 in an analogous manner via link (114*y*, 125A) and link (114*z*, 127A) respectively. Similarly source switches 111 and 112 are also connected to intermediate switches 120-122 so that every source switch in network 100 is connected by at least one link to every intermediate switch in network 100.

Although the embodiment described shows one and only one link between each source switch 110-112 and intermediate switch 120-122, other configurations are possible. These configurations include multiple connections between some pairs of source switches 110-112 and intermediate switches 120-122 and/or no connection between pairs of source switches 110-112 and intermediate switches 120-122. All of these possible variations are contemplated and included with the scope of the invention with the embodiment of network 100 reflecting one possible configuration of devices.

Intermediate switch 120 is connected to sink switch 130 via a link (124*x*, 133A). Intermediate switch 120 is connected to sink switches 131 and 132 in an analogous manner via link (124*y*, 135A) and link (124*z*, 137A) respectively. Similarly intermediate switches 121 and 122 are also connected to sink switches 130-132 so that every intermediate switch is connected by at least one link to every sink switch.

Although the embodiment described shows one and only one link between each intermediate switch 120-122 and sink switch 130-132, other configurations are possible. These configurations included multiple connections between some pairs of intermediate switch 120-122 and sink switches 130-132 and/or no connection between pairs of intermediate switch 120-122 and sink switches 130-132. All of these possible variations are contemplated and included with the scope of the invention with embodiment of network 100 reflecting one possible configuration of devices.

Sink switch 130 is connected to output ports 11, 12 and 13 via outputs 134*x*, 134*y* and 134*z* respectively. The link between the output ports 11-13 of the network 100 and the outputs of sink switch 134*x*-134*z* may be via a known standard such as TCP/IP over Ethernet or a propriety standard. One embodiment of the input port of the network may utilize a translation module that translates from a proprietary link protocol to a known standard. This architecture allows identical sink switches to connect to diverse network protocols, each of which may require a distinct translation module interface. In another embodiment the sink switch may incorporate one or more standard protocols as part of the outputs 134*x*-134*z* and eliminate the need for translation modules. In such a configuration the output port of the network becomes an output of at least one sink switch 130-132. In yet another embodiment several output ports of the network may be connected to a single output of a sink switch via a shared medium. All such embodiments and combinations of these embodiments are contemplated and included within the scope of the invention. Sink switches 131 and 132 are analogously connected to output ports 14-16 and 17-19 respectively.

The network 100 is preferably configured as a Clos network as is known in the art. But other blocking and non-blocking configurations including a fully connected crossbar switch are contemplated and included within the scope of the invention.

Although the configuration of network 100 has only a single layer of intermediate switches 120, 121, 122, multiple layers of intermediate switches may be used and are included within the scope of the invention. Likewise source switches 110-112 and sink switches 130-132 may be different from each other or identical. If all links within the network are identical, then it is preferable for the source and sink switches to be identical. Likewise all switches, source switches 110-112, intermediate switches 120-122 and sink switches 130-132 may identical. Each of these variations are contemplated and included within the scope of the invention.

In each layer of switches of network 100 three source switches 110-112, three intermediate switches 120-122 and three sink switches 130-132 are shown. Any number of switches may be included in the layers from a single switch to more than three switches with the embodiment of network 100 representing one possible configuration. Each layer may have a different numbers of switches from the other layers in any possible combination. All such configurations of switches are contemplated and included within the scope of the invention.

Although the source switches 110-112, intermediate switches 120-122 and sink switches 130-132 are shown as distinct devices other device configurations that combine the function of source switches 110-112 and intermediate switches 120-122, sources switches 110-112 and sink switches 130-132, in any combination are possible. All possible configurations are included within the scope of the invention including utilizing a single device to implement the network 100.

FIG. 2 is a diagram showing an embodiment of source switch 110. Source switch 110 has three inputs 113A, 113B and 113C. The inputs 113A-113C may be connected to memory 140. Source switch 110 has three outputs 114*x*, 114*y* and 114*z*. The outputs 114*x*-114*z* may be connected to memory 140. Memory 140 may be used to implement N virtual output queues 141A, 141B, 141C . . . 141N. Each virtual output queue 141A-141N buffers data for a particular destination. Transporting of data from a virtual output queue 141A-141N to a destination requires routing data to a particular output port of the network 100.

Although the description shows the use of a single memory 140 to implement all of the virtual output queues 141A-141N other implementations are possible—e.g., an individual memory for each virtual output queue 141A-141N—and are included within the scope of the invention. The single memory may be used to implement a non-blocking crossbar switch but other configurations including blocking configurations are contemplated and included within the scope of the invention.

Although the embodiment of source switch 110 shows three inputs and three outputs other configurations including greater or fewer inputs and/or greater or fewer outputs in any combination are contemplated. Likewise source switches with unmatched input and outputs—e.g., 2 inputs and 5 outputs—are contemplated as well. Each of the foregoing possibilities in any combination are contemplated and included within the scope of the invention.

FIG. 3 is a diagram showing an embodiment of sink switch 130. Sink switch 130 has three inputs 133A, 133B and 133C. The inputs 133A-133C may be connected to control module 150. Sink switch 130 has three outputs 134*x*, 134*y* and 134*z*. The outputs 134*x*-134*z* may be connected to control module 150. Control module 150 may be used to implement M scheduling mechanisms 151A, 151B . . . 151M.

Preferably each scheduling mechanism 151A-151M may control one of the outputs 134*x*-134*z* of sink switch 130. Alternatively, each scheduling mechanism 151A-151M may control some or all of the outputs 134*x*-134*z* of sink switch 130. In another alternative, multiple scheduling mechanisms 151A-151M may be assigned to each of the outputs 134*x*-134*z* of sink switch 130. In particular the number of virtual output queues N in a source switch may or may not be equal to the number of scheduling mechanisms M in a sink switch.

Each of these configurations as well as any other suitable configuration is contemplated and included within the scope of the invention.

Each scheduling mechanism 151A-151M may receive queue status information from one or more virtual output queues residing in one or more switches. Queue status information may be sent when a virtual output queue is allocated or initialized. Queue status information may also be sent when the status of the virtual output queue changes. Queue status information may contain status—e.g., queue full, queue nearly full, queue at midpoint etc. Queue status information may contain commands—e.g., speed up transmission, speed up transmission a lot, slow down etc.

The scheduling mechanisms 151A-151M may be used to generate credits in response to the queue status information. Credits permit data to be routed via the network 100 from a source switch to a sink switch. Allocation may take the form of reserving links or reserving a portion of the bandwidth of links. The foregoing description requires, at a minimum, links that carry control information such as queue status information from virtual output queues to scheduling mechanisms. Likewise there should be links that carry credits from scheduling mechanisms to virtual output queues. Preferably data links within the network 100 are able to carry both data and control information in either direction.

Although the description shows the use of a single control module 150 to implement all of the scheduling mechanisms 151A-151M other configurations are possible—e.g., an individual module for each scheduling mechanisms 151A-151M—and are included within the scope of the invention. The single control module 150 may be used to implement a non-blocking crossbar switch and/or output queues for the sink switch 130. All of these configurations including blocking configurations and any other suitable configuration are contemplated and included within the scope of the invention.

Although the embodiment of sink switch 130 shows three inputs and three outputs, other configurations including greater or fewer inputs and/or greater or fewer outputs in any combination are contemplated. Likewise sink switches with unmatched input and outputs—e.g., 2 inputs and 5 outputs—are contemplated as well. Each of the foregoing possibilities in any combination are contemplated and included within the scope of the invention.

Network 100 transports data at least in part based on the allocation of bandwidth. Data is usually presented as a data packet (or a portion of a data packet) at an input of a source switch—e.g., 113A of source switch 110. The data packet (or portion of a packet) may have a header containing a destination address. The destination address may be mapped to an output port of the network—e.g., output port 11 of network 100.

The transport of data may be initiated by the processing of the header by a source switch. The source switch preferably allocate a virtual output queue—e.g., virtual output queue 141A of source switch 110—dedicated to that particular output port. The data packet (or portion of packet) may be stored in that virtual output queue. There may be an almost unlimited number of virtual output queues to the same destination involving, for example, different flows to the same destination and/or different traffic classes to the same destination. Preferably, each virtual output queue (or at least each unicast virtual output queue) is assigned with an output port (or a logical output port, which can be a sub-port of the output port of network 100.) In the alternative the data packet (or portion of packet) may be stored in an existing queue which had been allocated previously.

In some embodiments of the invention, once the packet (or portion of packet) has been stored, the virtual output queue will send queue status information to the scheduling mechanism in a sink switch—e.g., scheduling mechanism 151A of sink switch 130. The queue status information may be based on a change of status of the queue. The scheduling mechanism will respond, with an appropriate credit for bandwidth. Credits may be allocated based on route congestion, congestion at the sink switch or congestion at the output port of the network or any other suitable criteria. Credits are preferably allocated according to a scheme between preferably all competing virtual output queues in all source switches that have something to send to the destination—i.e., virtual output queues that are not empty or that are not in an OFF state. The scheduling may be simple (all queues with equal shares) or based on priorities (strict priority and/or weights), using one or multiple hierarchies (tunnels, customers, applications, etc.).

Upon receipt of the credit the virtual output queue may send the data packet (or portion of packet) to sink switch via an intermediate switch or switches. The amount of data sent by the virtual output queue may be controlled by the credit received.

Figure 4A:
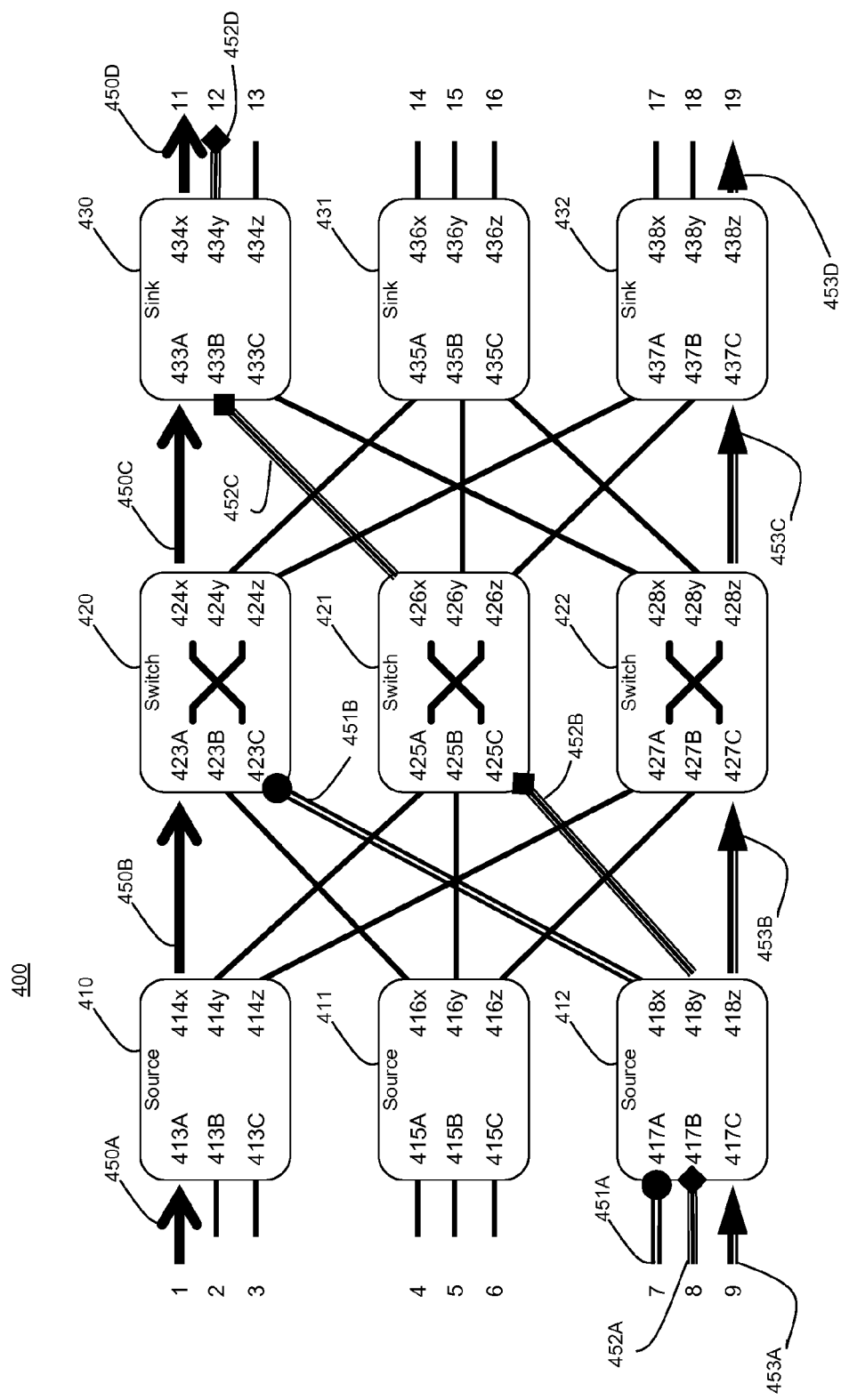
FIG. 4a shows a network with a blocked route.

Sending the data packet (or portion of packet) via the network requires the switches in the network to be configured to route data flows. FIG. 4a shows example routes for several data flows in a network 400. The diagram presumes that bandwidth credit has been allocated to permit the data flows to be routed simultaneously. However routing choices may create bottlenecks or blocking within the network 400. In particular when the data flows are routed one at a time, a requirement for routing two flows along a single link may occur. Such a conflict may necessitate rerouting of some or all of the existing routes.

In order to simplify the description of routing a data flow (or simply a flow) through the network will be designated by a series segments—e.g., flow 450 is the collection of segments 450A-450D—and is shown in the FIG. 4a as a series of segments. Each segment must be routed to allow movement of data from that flow.

FIG. 4a shows how blocking occurs after a particular sequence of flows are routed. It should be noted that FIG. 4a describes one form of static routing, which represents, generically, many forms of static routing. The static routing shown in FIG. 4a selects according to the source port, destination port or source port and destination port combination. It is also possible to use sink 530 as the target without directing the packet and/or portion of packet to the specific output port of the network. Thus, intermediate switch 520 can, but is not required, to be aware of the specific ports 11,12 or 13. Rather, it is sufficient to be aware how to reach the sink switch. Once the flow arrives at the sink switch, the sink switch can use the specific output information to select a specific output port of the sink switch. This method preferably reduces the amount of information in the routing tables of other devices within the network.

First, flow 450 may connect input port 1 to output port 11. Flow 450 is comprised of segments 450A, 450B, 450C and 450D. Segment 450A may be routed along the link (1,413A) to source switch 410. The data may be buffered in a virtual output queue within source switch 410. Segment 450B may be routed over link (414x,423A) to intermediate switch 420. Segment 450C may be routed over link (424x,433A) to sink switch 430. Finally, segment 450D may be routed over link (434x,11) to the output port 11 of network 400.

Next, flow 453 may be added to connect input port 9 to output port 19. Flow 453 is comprised of segments 453A-450D. Segment 453A is routed along the link (9,417C) to source switch 412. The data may be buffered in a virtual output queue within source switch 412. Segment 453B may be routed over link (418z,427C) to intermediate switch 422. Segment 453C may be routed over link (428z,437C) to sink switch 432. Finally, segment 453D may be routed over link (438z,19) to the output port 19 of network 400.

Next, flow 452 may be added to connect input port 8 to output port 12. Flow 452 is comprised of segments 452A-452D. Segment 452A may be routed along the link (8,417B) to source switch 412. The data may be buffered in a virtual output queue within source switch 412. Segment 452B may be routed over link (418y,425C) to intermediate switch 421. Segment 452C may be routed over link (426x,433B) to sink switch 430. Finally, segment 452D may be routed over link (434y,12) to the output port 12 of network 400.

Finally, flow 451 may be added to connect input port 7 to output port 13. However flow 451 is comprised only of segments 451A and 451B. Segment 451A is routed along the link (7,417A) to source switch 412. The data may be buffered in a virtual output queue within source switch 412. Segment 452B may be routed over link (418x,423C) to intermediate switch 420. But no further segment can be routed because the desired destination for flow 451 is output port 13 of network 400. This path requires the use of link (424x,433A) which is already occupied by flow 450. Some rerouting of the non-blocked flows is required to allow flow 451 to be routed.

Figure 4B:
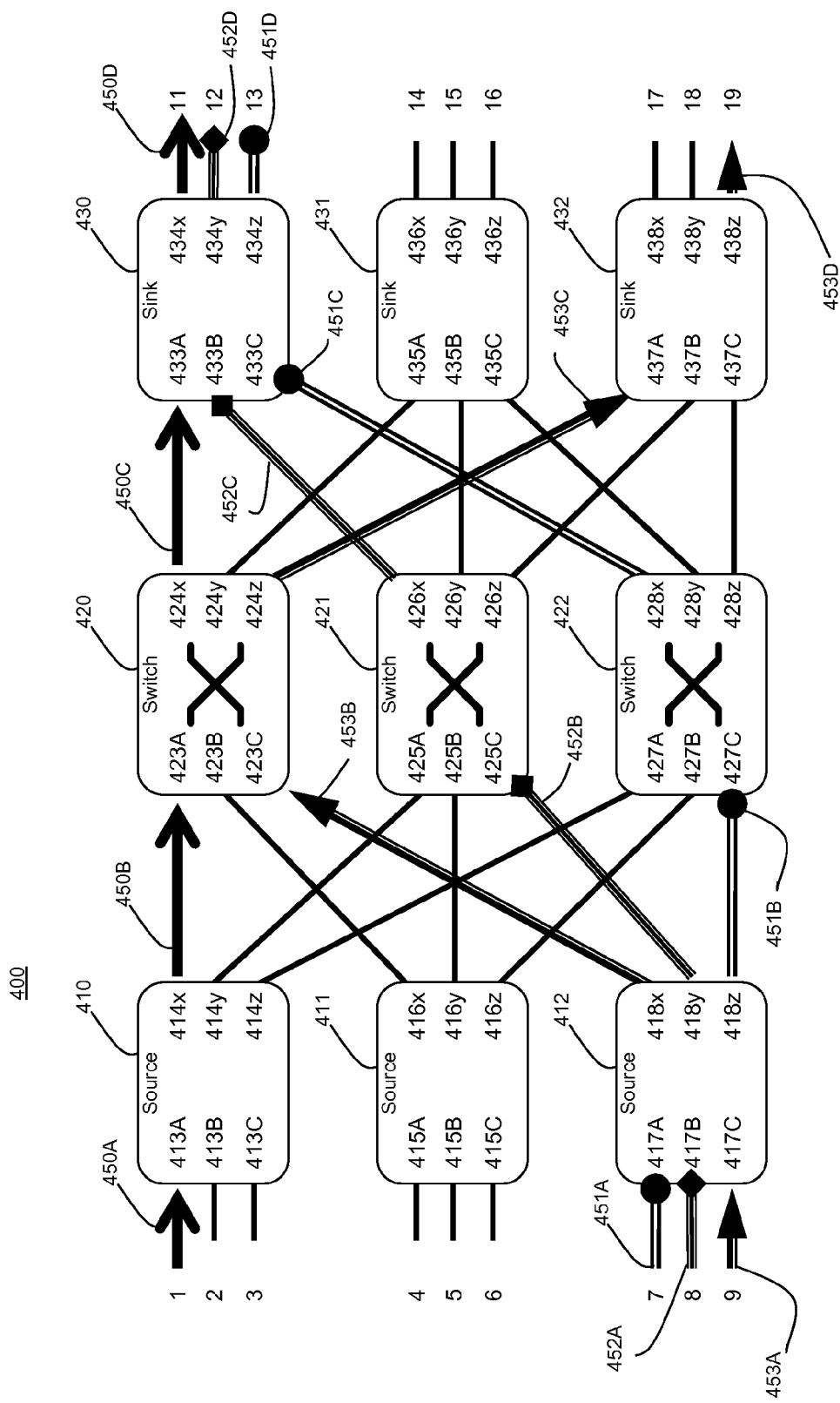
FIG. 4b shows a network with a unblocked route.

FIG. 4b shows an alternate routing arrangement for network 400 that allows all four flows, 450-453 to reach their destinations without blocking each other. Note that only the route of flow 453 is altered to allow the routing flow 451 to output 13 of network 400. As was shown in FIG. 4a flow 450 remains routed between input 1 and output 11 via links; (1,413A), (414x-423A), (424x,433A) and (434x,11). Similarly, flow 452 remains routed along links; (8,417B), (418y, 425C), (426x,433B) and (434y,12).

However in FIG. 4b flow 453 is routed differently than in FIG. 4a. Segment 453 is routed along the link (9,417C) to source switch 412. As before the data may be buffered in a virtual output queue within source switch 412. Segment 453B is routed over link (418x,423C) to intermediate switch 420. Segment 453C is routed over link (424z,437A) to sink switch 432. Finally, segment 453D is routed over link (438z, 19) to the output port 19 of network 400.

The change of route for flow 453 permits flow 451 to have an unobstructed path to output 13 of network 400. Flow 451 is comprised of segments 451A-451D. Segment 451A is routed along the link (7,417A) to source switch 412. The data may be buffered in a virtual output queue within source switch 412. Segment 451B is routed over link (418z,427C) to intermediate switch 422. Segment 451C is routed over link (428x,433C) to sink switch 430. Finally, segment 451D is routed over link (434z, 12) to the output port 13 of network 400 as desired.

Note that the routes of FIG. 4a and FIG. 4b are essentially static once established. Although rerouting allows all flows to operate simultaneously, the rerouting process is complex and may require the cooperation of the entire network 400. Situations may occur that require every route of every flow in the network 400 to be changed in order to accommodate a single new flow. Rerouting may cause interruptions in the existing flows and may require substantial resources. It would be desirable to create routes that operate in a cooperative manner. In addition it would be desirable to make routing decisions on a local basis instead of requiring a decision across the entire network 400.

Figure 4C:
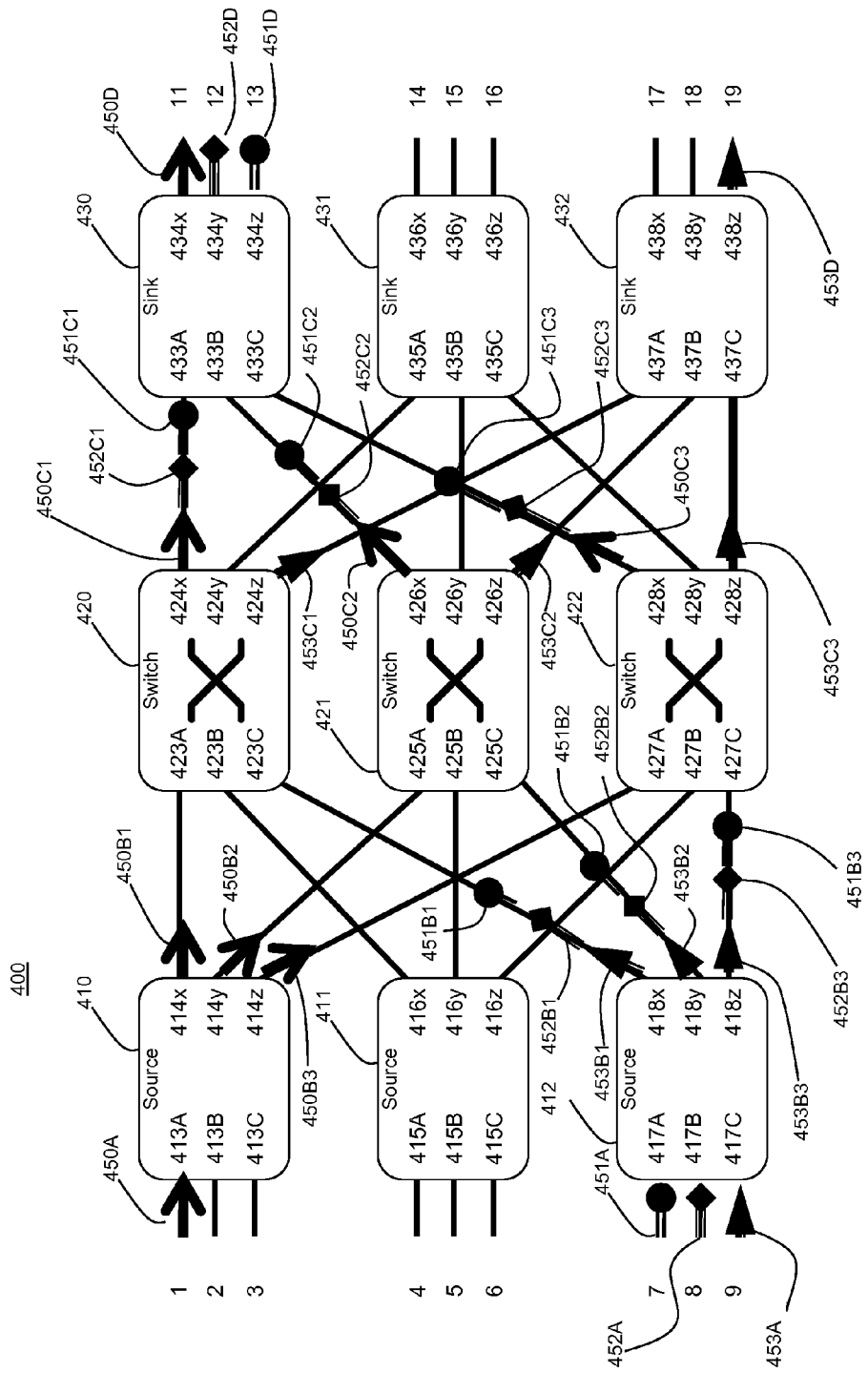
FIG. 4c shows a network with dynamic routing.

FIG. 4c shows an embodiment of dynamic routing which has advantages over the previously described static routing method. As before flow 450 will route between input 1 and output 11, flow 451 will route between input 7 and output 13, flow 452 will route between input 8 and output 12 and flow 453 will route between input 9 and output 19.

As described in previous diagrams, flows—e.g. flow 450— may be comprised of segments 450A, 450B, 450C and 450D. FIG. 4c illustrates that each segment may be further comprised of sub-segments—e.g., segment 450B may be comprised of sub-segments 450B1, 450B2 and 450B3. Other segments may not be comprised of sub-segments—e.g., segment 450A.

Flow 450 may connect input port 1 to output port 11. Flow 450 may be comprised of segments 450A, 450B, 450C and 450D. Segment 450A may be routed along the link (1,413A) to source switch 410. The data may be buffered in a virtual output queue within source switch 410. Segment 450B may be comprised of sub-segments 450B1, 450B2 and 450B3. Each sub-segment may be used to transport a portion of data moved by flow 450.

The data may be distributed among the sub-segments in one or more packets (or in one or more portions of packet). A single packet may be distributed among several sub-segments. It is also possible to utilize only one sub-segment of the available sub-segments. The distribution of data packets (or portions of packet) over the sub-segments of segment 450B may be decided locally by source switch 410. The distribution decision may be based on at least one distribution algorithm. Any number of sub-segments may be used to form one segment.

Sub-segment 450B1 may be routed over link (414x,423A) to intermediate switch 420. Sub-segment 450B2 may be routed over link (414y,425A) to intermediate switch 421. Sub-segment 450B3 may be routed over link (414z,427A) to intermediate switch 422. The resulting distribution allows flow 450 to make use of every intermediate switch in the network 400.

Segment 450C may be comprised of sub-segments 450C1, 450C2 and 450C3. Sub-segment 450C1 may be routed over link (424x,433A) to sink switch 430. Sub-segment 450C2 may be routed over link (426x,433B) to sink switch 430. Sub-segment 450C3 may be routed over link (428x,433C) to sink switch 430. Segment 450D may be routed over link (434x, 11) to the output port 11 of network 400.

Next, flow 453 may be added to connect input port 9 to output port 19. Flow 453 may be comprised of segments 453A-453D. Segment 453A may be routed along the link (9,417C) to source switch 412. The data may be buffered in a virtual output queue within source switch 412. Segment 453B may be comprised of sub-segments 453B1, 453B2 and 453B3. Each sub-segment may be used to transport a portion of data moved by flow 453. As with flow 450, the data may be distributed among the sub-segments in one or more packets (or a plurality of portions of packets). The distribution of data packets over the sub-segments of segment 453B may be decided locally by source switch 412.

Sub-segment 453B1 may be routed over link (418x,423C) to intermediate switch 420. Sub-segment 453B2 may be routed over link (418y,425C) to intermediate switch 421. Sub-segment 453B3 may be routed over link (418z,427C) to intermediate switch 422.

Segment 453C may be comprised of sub-segments 453C1, 453C2 and 453C3. Sub-segment 453C1 may be routed over link (424z,437A) to sink switch 432. Sub-segment 453C2 may be routed over link (426z,437B) to sink switch 432. Sub-segment 453C3 may be routed over link (428z,437C) to sink switch 432. Segment 453D may be routed over link (438z, 19) to the output port 19 of network 400.

Next, flow 452 may be added to connect input port 8 to output port 12. Flow 452 may be comprised of segments 452A-452D. Segment 452A may be routed along the link (8,417B) to source switch 412. Segment 452B may be comprised of sub-segments 452B1, 452B2 and 452B3. The distribution of data packets over the sub-segments of segment 452B may be decided locally by source switch 412.

Sub-segment 452B1 may be routed over link (418x,423C) to intermediate switch 420. Sub-segment 452B2 may be routed over link (418y,425C) to intermediate switch 421. Sub-segment 452B3 may be routed over link (418z,427C) to intermediate switch 422. Each of the sub-segments of segment 452B may share links with the sub-segments of segment 453B—e.g., both sub-segment 453B3 and sub-segment 452B3 use link (418z,427C). Thus, the links in network 400 may route more than one flow at a time. The support of multiple flows can be accomplished via time multiplexing of the data packets (or portions of data packets) of each flow or by any suitable method. The utilization of the link by one or more sub-segments of flows may be controlled by the distribution algorithm implemented by source switch 412.

Segment 452C may be comprised of sub-segments 452C1, 452C2 and 452C3. Sub-segment 452C1 may be routed over link (424x,433A) to sink switch 430. Sub-segment 452C2 may be routed over link (426x,433B) to sink switch 430. Sub-segment 452C3 may be routed over link (428x,433C) to sink switch 430. Segment 452D may be routed over link (434y, 12) to the output port 12 of network 400. Note that sub-segments of segment 452C share links with sub-segments of segment 450C. As described above link sharing may be controlled by the distribution algorithm of intermediate switches 420, 421 and 422.

Finally, flow 451 may be added to connect input port 7 to output port 13. Flow 451 may be comprised of segments 451A-451D. Segment 451A is routed along the link (7,417A) to source switch 412. Segment 451B may be comprised of sub-segments 451 B1, 451 B2 and 451 B3. Sub-segment 451 B1 may be routed over link (418x,423C) to intermediate switch 420. Sub-segment 451 B2 may be routed over link (418y,425C) to intermediate switch 421. Sub-segment 451 B3 may be routed over link (418z,427C) to intermediate switch 422. Segment 451C may be comprised of sub-segments 451C1, 451C2 and 451C3. Sub-segment 451C1 may be routed over link (424x,433A) to sink switch 430. Sub-segment 451C2 may be routed over link (426x,433B) to sink switch 430. Sub-segment 451C3 may be routed over link (428x,433C) to sink switch 430. Segment 451D may be routed over link (434z, 13) to the output port 13 of network 400.

The use of a distribution algorithm to distribute data over multiple links and to multiplex data on these links has several advantages. First, the routing is non-blocking. Every possible route can be added without requiring the re-routing of existing routes. Second, routing becomes a local decision, greatly simplifying the control of network 400. Last, it is easier to route around inoperative links that are congested or damaged.

Although FIG. 4c shows each segment that is comprised of sub-segments distributed over every possible output of each switch, other configurations are possible and included within the scope of the invention. For instance some switches make allow fewer than the maximum number of outputs to be used by a segment. Some flows may have higher priority than others and have a greater allocation of switch outputs than others.

Likewise some of the segments are not distributed—e.g., segment 450A of flow 450—may be distributed. An example distribution of segment 450A would divide the segment into sub-segment 450A1 and 450A2. Sub-segment 450A1 would use link (1,413A) to reach source switch 410. Sub-segment 450A2 would use link (8,417B) to reach source switch 412. Such a distribution presumes additional mechanisms external to the network 400.

Dynamic routing as shown in FIG. 4c does have a disadvantage with respect the static routing of FIG. 4c. Static routing provides only a single path for all packets. Thus the order of packet arrival at an output port is guaranteed. When packets are distributed over multiple sub-segments there is no way to assure that the packets arrive in a particular order as some links may be faster than others. Dynamic routing therefore requires the numbering or ordering of packets (or portions of packets) and the reordering of packets (or portions of packets) by the sink switch.

Figure 5A:
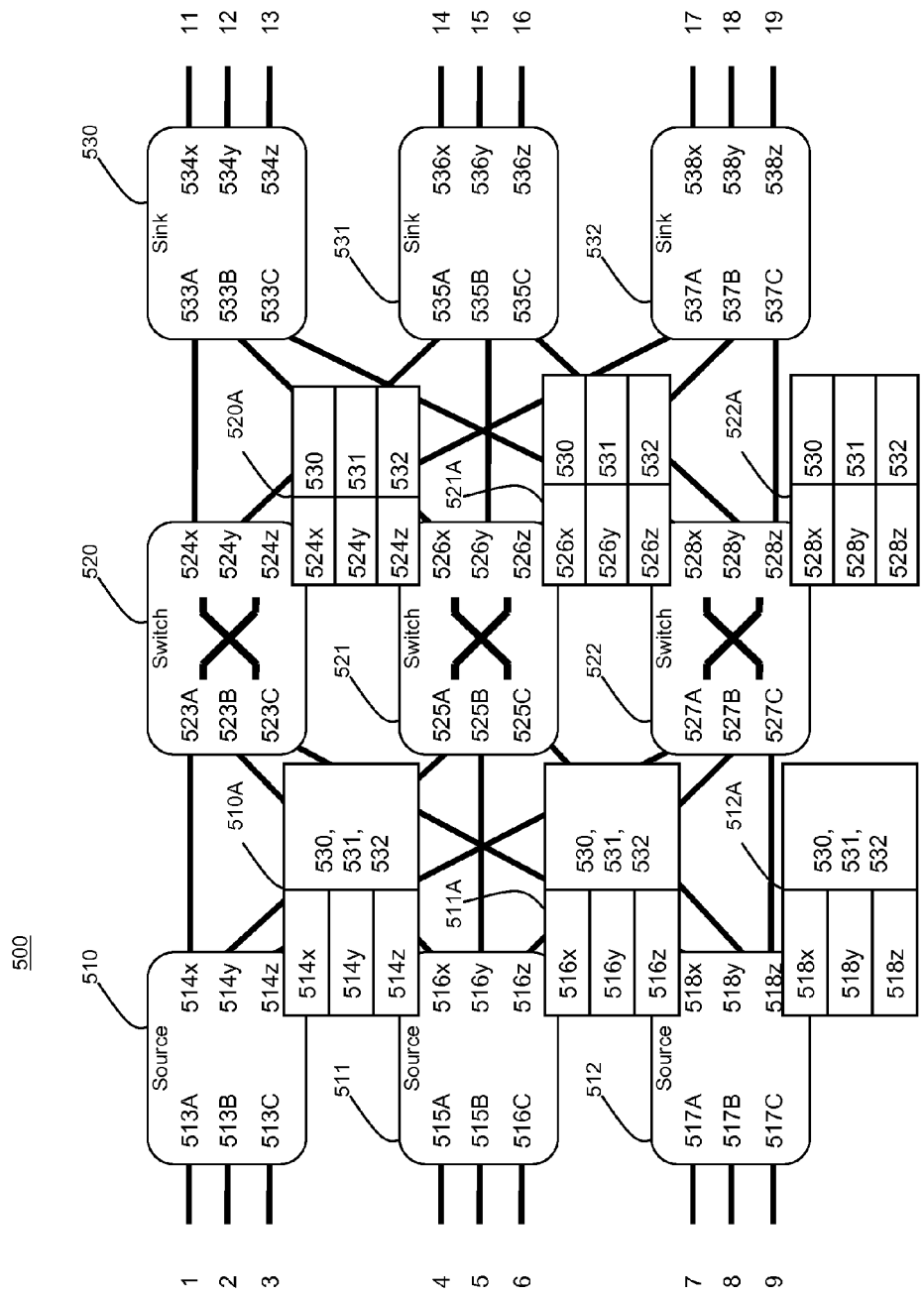
FIG. 5a shows a network with routing tables.

FIG. 5a shows another embodiment of a network 500 which incorporates the distribution of destination routing tables, hereinafter tables. Network 500 is identical topologically to network 100 shown in FIG. 1. This embodiment enables improved routing efficiency by distributing routing tables to switches in the system. One embodiment of the routing tables may contain a mapping of the outputs of switches to accessible sink devices, as identified by the sink device number, of network 500.

Preferably the mappings are complete—i.e., each table maps all accessible sink devices. However shorter tables containing only some of the accessible sink devices are contemplated and are included within the scope of the invention.

Intermediate switch 520 creates intermediate table 520A, hereinafter table 520A. Table 520A maps output 524x to sink switch 530. Output 524y is mapped to sink switch 531, and output 524z is mapped to sink switch 532. Intermediate switches 521 and 522 create tables 521A and 522A in a similar way. The tables 520A, 521A and 522A are shared with source switches 510, 511 and 512.

Source switch 510 creates table source 510A, hereinafter table 510A. Table 510A maps output 514x to sink switches 530, 531 and 532—i.e., to every sink switch of the network. Output 514y is mapped to sink switches 530, 531 and 532, and output 514z is also mapped to sink switches 530, 531 and 532. Source switches 511 and 512 create tables 511A and 512A in a similar way.

Once the tables are stored in the switches, routing of packets (or portions of packets) in various flows can take place more conveniently. If one maps the static flows shown in FIG. 4b to network 500, the routing of flows 450 and 452 are straightforward. The routing of flow 451 which can conflict with flow 450 may be easily rerouted in conjunction with the routing of flows 453 and 452 to prevent blocking. It should be noted that a comprehensive solution to the static routing problem may require knowledge of every table in the network 400. It should be further noted that the dynamic routing described in FIG. 4c may utilize the tables 510A-512A and 520A-522A more effectively.

Although it is possible to store the tables in the switches only once, it is preferable to update the tables continuously or periodically, preferably at a predetermined interval. One such update rate would be once every millisecond but other rates are contemplated and are within the scope of the invention. Updates may take place frequently in order to exclude unreachable routes to the destination—i.e., to use only the routes that can reach the required destination when a particular link becomes inoperative. Other failures which can also be handled by such systems and methods according to the invention may include multiple link failures, device failures, multiple device failures, module failures, chassis failures, switch failures, etc.

Figure 6A:
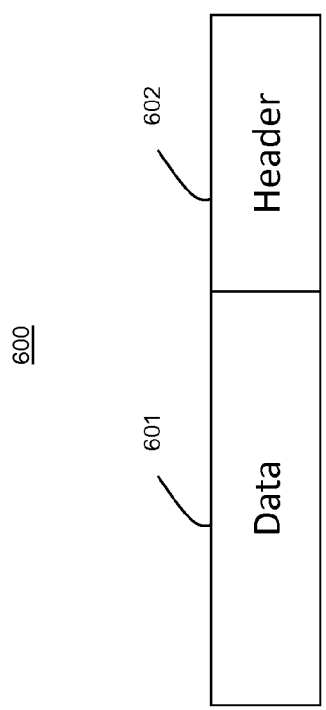
FIG. 6a shows a data packet.

In another embodiment of the invention packet processing is made more efficient and may make use of the tables 510A-512A and 520A-522A. FIG. 6a shows a common configuration of a data packet 600 with a data section 601 and a header 602. The header will typically contain the destination address for the packet (or portion of packet). Each type of packet—e.g., a TCP/IP packet—is processed according the layout of the header to obtain the destination address to enable routing of the packet 600 (or portion of packet). Routing of packets may take place according to a prearranged static route or via dynamic routing; in either case the destination should preferably be known. Typically the header is processed at each stage of a route. For example, in FIG. 4a, a packet routed via flow 450 would travel through source switch 410, intermediate switch 420 and sink switch 430. At each switch the header will be processed to extract the destination address. After the destination address is obtained by a switch the next stage of the route can be followed.

Processing of the header may require processing power and memory in a switch. In this embodiment of the invention the packet header is processed either by translation module prior to entering network 400, or in the first switch traversed by the packet 600—e.g., source switch 410. After the initial header processing the header is preferably not processed again, thus creating a single tier network—i.e., a processing network that processes a header once and, accordingly, is independent of further processing. The header processing obtains the destination address from header 602. Next, the destination address is mapped to a destination relative to network 400—i.e. an output port of the network. An example route such as flow 450 would have a destination of output port 11 of network 400.

Figure 6B:
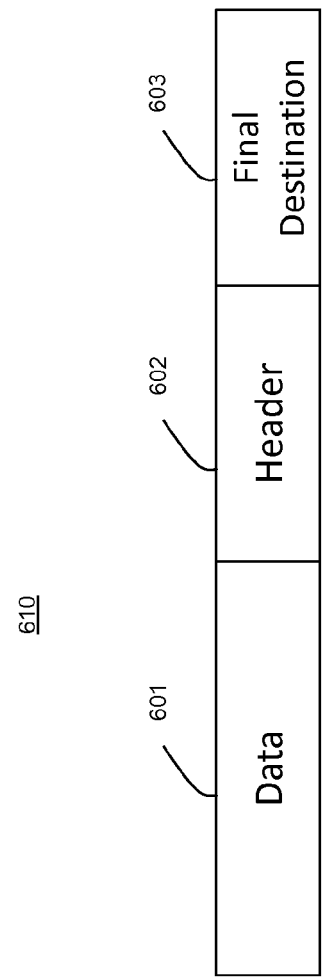
FIG. 6b shows data packet with a final destination.

The final destination may be appended to the header 601 as a final destination 603 as shown in FIG. 6b. The modified packet 610 (or portions of packets) may be routed without processing the header by following routing tables stored in each switch. In certain embodiments of the invention, the decision regarding the output may be made locally at the sink device. Routing tables as shown in FIG. 5a route to a sink switch.

As an example, FIG. 4b shows a flow 450 which may route its packets (or portions of packets) as follows. First, a data packet 600 (or portions of a data packet) may be sent to source switch 410 via segment 450A where the header 602 may be processed and converted to a packet 610 (or portions of a packet, respectively). The final destination 603 for flow 450 is output port 11 of network 400. Next, the packet 610 (or portions of the packet) may be sent to intermediate switch 420 via segment 450B. Intermediate switch 420 may utilize final destination 603 to route packet 610 to sink switch 430.

Finally, sink switch 430 converts packet 610 to packet 600 and routes packet 600 (or portions of a packet) to final destination 11 of network 400. Thus, the header is only processed once for the entire route through network 400. Internal routing decisions depend only on the final destination 603.

Note that stored routing tables—e.g., table 520A of FIG. 5a—enhance the advantages of processing the header once by enabling high speed routing without further processing of the header. The tables aid in routing by providing the list of outputs at each switch that can reach the final destination.

An alternative embodiment may implement the dynamic routing shown in FIG. 4c overlaid onto network 500. Using flow 450 as an example, a flow may be established to output port 11 of network 400. First, a data packet 600 (or portions of a data packet) may be sent to source switch 410 via segment 450A where the header 602 may be processed and converted to a packet 610 (or portions of a data packet).

Next, the source switch 410 may use a distribution algorithm to choose which sub-segment should be used for transport. In this particular case, a routing table may be unnecessary, further simplifying source switch 410. No table is necessary in this example because in this configuration of network 400 every intermediate switch will have access to every output port of the network.

After one sub-segment is chosen, packet 610 (or portions of packets) may be routed to an intermediate switch. In this example sub-segment 450B1 is chosen and packet 610 is routed to intermediate switch 420. Next the final destination 603 may be used by the intermediate switch 420 to route the packet 610 via sub-segment 450C1 to sink switch 430. Finally, sink switch 430 converts packet 610 to packet 600 and routes packet 600 to final destination 11 of network 400.

Figure 6C:
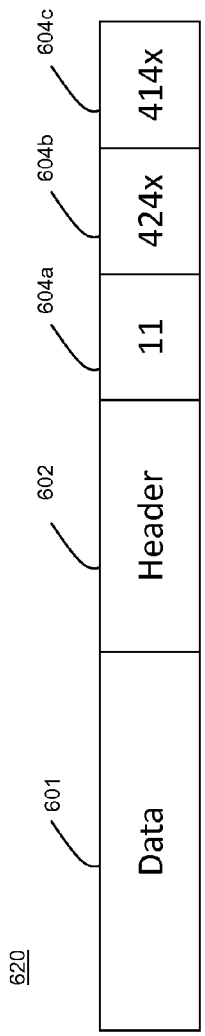
FIG. 6c shows a data packet with explicit routing information.

FIG. 6c shows another embodiment that may be used to optimize packet header processing. Packet 620 (or portions of packets) has a data section 601, a header 602 and three routing sections 604a, 604b and 604c. The routing sections contain explicit routing instructions for packet 620 (or portions of packets). The embodiment of network 500 comprises three layers of switches which constrain the number of routing sections. Other configuration of network 500 containing any number of layers is contemplated. Hence, any number of routing sections is contemplated and included within the scope of the invention.

Figure 6D:
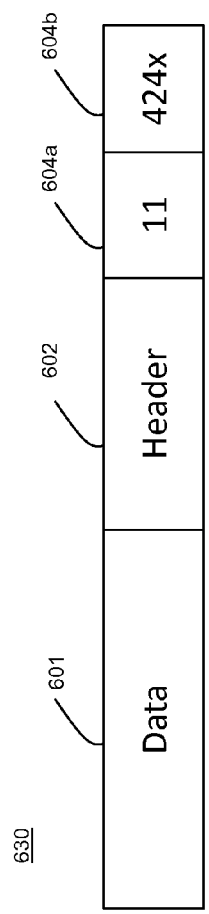
FIG. 6d shows a data packet with explicit routing information.
Figure 6E:
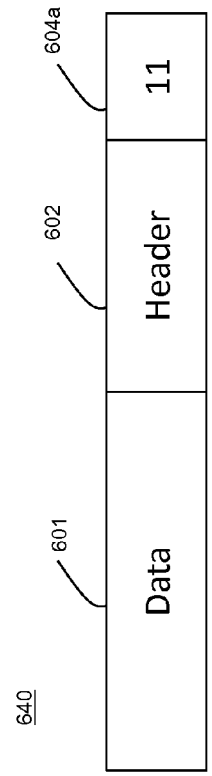
FIG. 6e shows a data packet with explicit routing information.

As an example a packet 600 (or portions of a packet) may be sent along flow 450 in FIG. 4b as follows. A packet 600 is sent to sink switch 410 via segment 450A where the header 602 is processed to produce a packet 620. Source switch 410 then removes and retrieves the value of routing section 604c from packet 620 to produce packet 630 as shown in FIG. 6d. Source switch 410 then uses output 414x, which is the value retrieved from routing section 604c, to send packet 630 to intermediate switch 420 via segment 450B. Intermediate switch 420 then removes and retrieves the value of routing section 604b from packet 630 to produce packet 640 as shown in FIG. 6e. Intermediate switch 420 then uses output 424x to send packet 640 to sink switch 430 via segment 450C. Sink switch 430 then removes and retrieves the value of routing section 604a from packet 640 to produce packet 600. Then sink switch 430 sends packet 600 to output port 11 of network 400 via segment 450D.

Figure 6F:
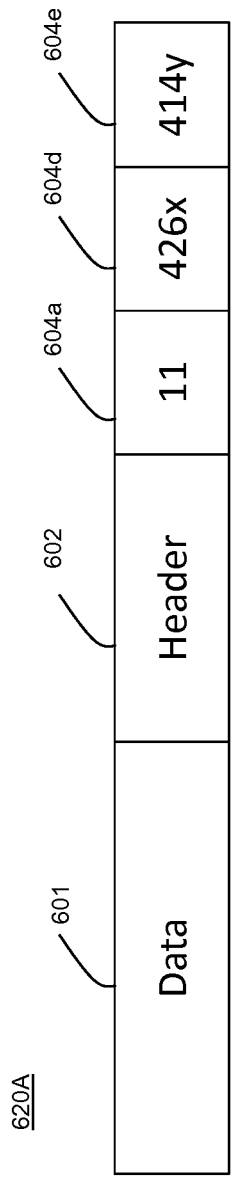
FIG. 6f shows a data packet with explicit routing information.

An alternative use of the processed packet 620 (or portions of a packet) utilizes the dynamic routing shown in FIG. 4c overlaid on network 500. An example of utilizing packet 620 (or portions of a packet) within the dynamic routing method proceeds as follows. As before a packet 600 (or portions of packets) of flow 450 is sent to sink switch 410. Sink switch 410 processes the header 602 to produce a packet 620A as shown in FIG. 6f. All dynamic routing decisions may be made by source switch 410 at this point.

Figure 6G:
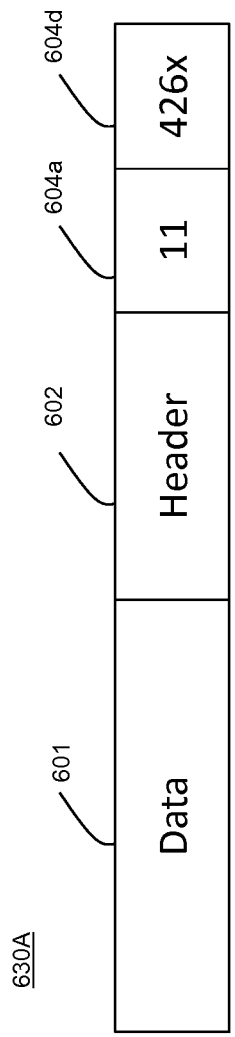
FIG. 6g shows a data packet with explicit routing information.

Source switch 410 then removes and retrieves the value of routing section 604e from packet 620A to produce packet 630A as shown in FIG. 6g. Source switch 410 then uses output 414y to send packet 630A to intermediate switch 421 via sub-segment 450B2. Intermediate switch 420 then removes and retrieves the value of routing section 604d from packet 630A to produce packet 640 as shown in FIG. 6e. Intermediate switch 421 then uses output 414x to send packet 640 to sink switch 430 via sub-segment 450C1. Sink switch 430 then removes and retrieves the value of routing section 604a from packet 640 to produce packet 600. Then sink switch 430 sends packet 600 to output port 11 of network 400 via segment 450D. Note that it is preferable for the only dynamic routing decision that can be made for this route is made at sink switch 410. Intermediate switch 421 has no dynamic routing options but will make use of the load distributing algorithm to coordinate the sharing of link (426x, 433B) among several flows.

Although the configuration shown in FIG. 4c of the dynamic routing of network 400 allows all dynamic routing decisions to be made at the source switch other configuration are contemplated and included within the scope of the invention. As an example two layers of intermediate switches would allow dynamic routing decisions to be made at the first layer of intermediate switches. One alternative is to allow the source switch to make all dynamic allocations for the entire network as was shown in the simplified example described above. An alternative embodiment would allow the packet to be reprocessed by each switch to adjust to local routing demands.

Although destination based routing tables are used together with single header processing, each technique is useful in its own right and is contemplated within the scope of the invention. Processing the header only once and using other methods of routing is useful, since the intermediate switches and sink switches never process a header. Likewise, creating the tables in each switch, allows rerouting around inoperative links even if the headers of packets are processed at each switch in the network.

Figure 5B:
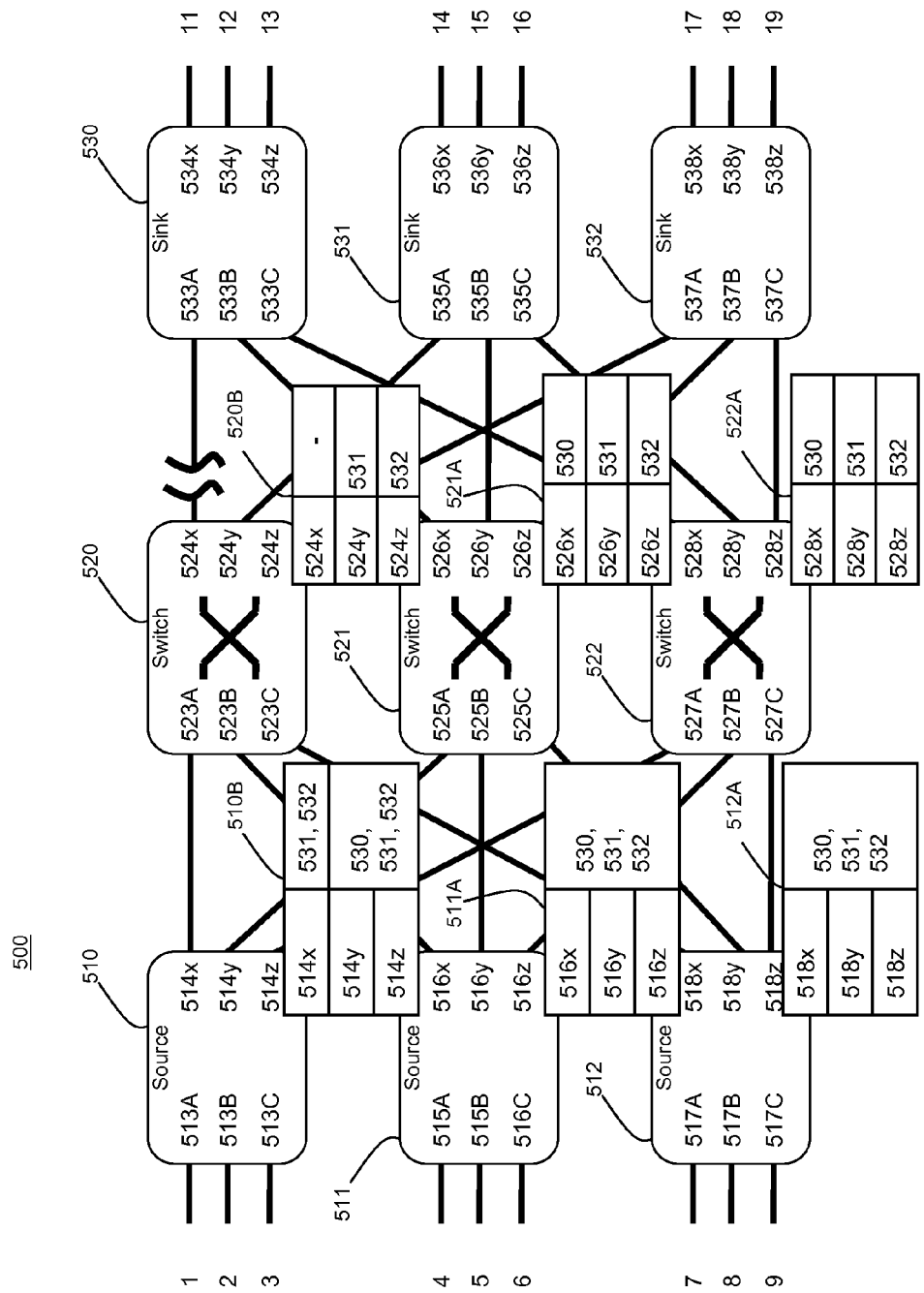
FIG. 5b shows a network with routing tables accommodating an inoperative link.

FIG. 5b shows another example of the same network 500 shown in FIG. 5a. However, in this example link (524x,533A) has failed. The tables shown in FIG. 5b may be updated and the resulting routing is established as follows. First, each sink switch obtains a mapping of switch outputs to sink switches.

Intermediate switch 520 creates table 520B. Table 520B maps output 524x to nothing. Output 524y is mapped to sink switch 531, and output 524z is mapped to sink switch 532. Intermediate switches 521 and 522 create tables 521A and 522A as described above with respect to the embodiment shown in FIG. 5a.

The tables 520B, 521A and 522A are shared with source switches 510, 511 and 512. Source switch 510 creates table 510B. Table 510B maps output 514x to sink switches 531 and 532. Output 514y is mapped to sink switches 530, 531 and 532, and output 514z is mapped to sink switches 530, 531 and 532. Source switches 511 and 512 create tables 511A and 512A as described above with respect to the embodiment shown in FIG. 5a.

Once the tables are stored in the switches routing of packets in various flows can take the failed link into account. In the static routing scenario embodiment described with respect to FIG. 4b the routing of flow 450 is blocked. This is an absolute blockage because inputs 433B and 433C are occupied by flows 452 and 451 respectively. The updated tables expose the fault to network 500, leaving the problem to be solved by higher networking layers in the protocol.

The dynamic routing embodiment described with respect to FIG. 4c may use the updated routing tables to route around the failed link as follows. Using flow 450 as an example a route may be established to output port 11 of network 400. First, a data packet 600 (or portions of a data packet) is sent to source switch 410 via segment 450A where the header 602 is processed and converted to a packet 610.

Next, the source switch 410 uses a distribution algorithm to choose which sub-segment should be used for transport. In this example given the failure of link (524x,533A) only two sub-segments may be chosen. In this example sub-segment 450B3 is chosen and packet 610 is routed to intermediate switch 422. Next the final destination 603 is used by the intermediate switch 422 to route the packet 610 (or portions of a data packet) via sub-segment 450C3 to sink switch 430.

Finally, sink switch 430 routes packet 610 (or portions of a packet) to output port 11 of network 400. This route avoids the failed link (524x,533A).

Although the preferred embodiment would use dynamic routing together with single header processing, a final destination packet (or portions of packets) and tables; all other possible combinations are contemplated and are included within the scope of the invention.

Figure 7:
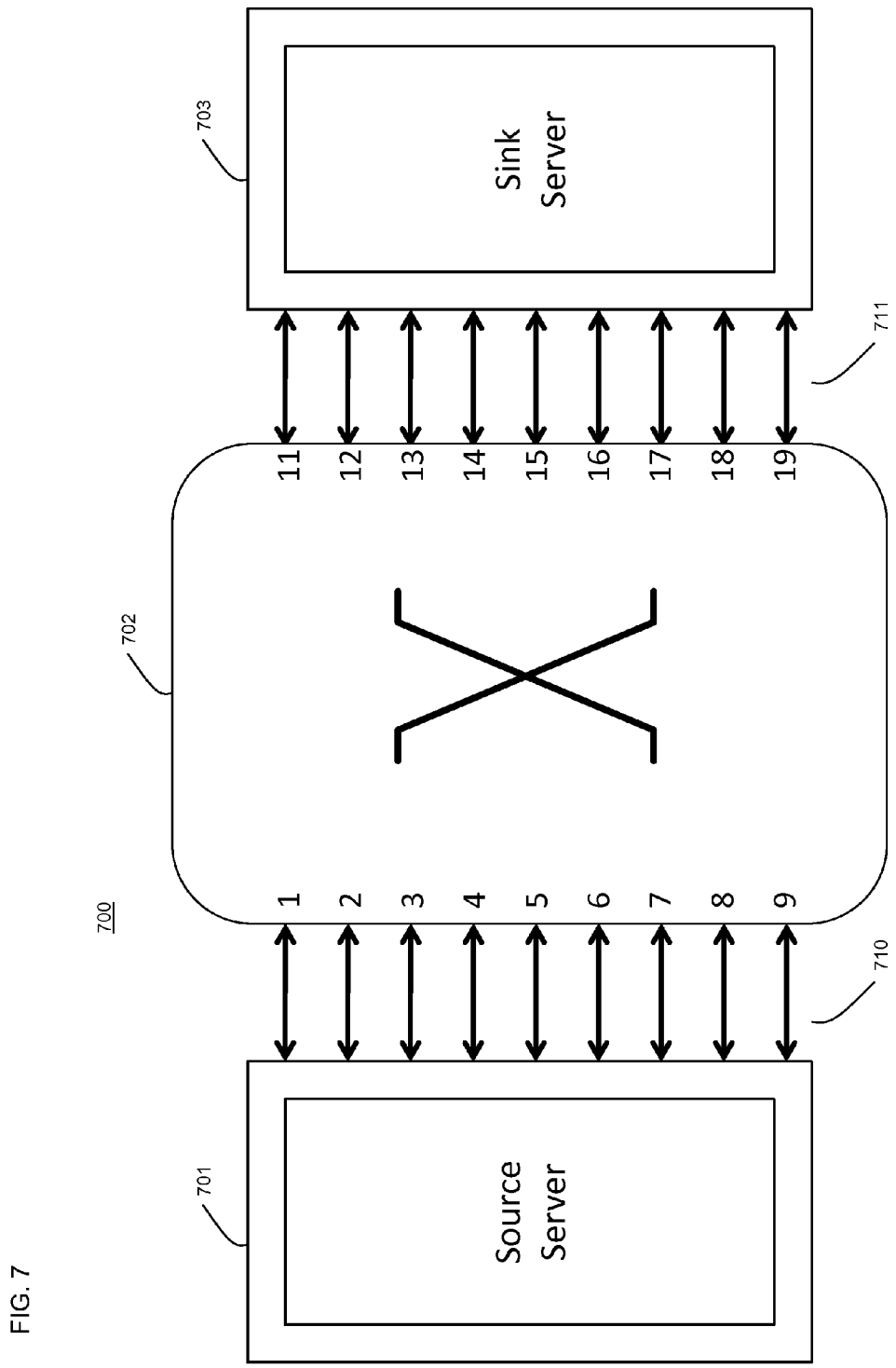
FIG. 7 shows an example architecture of servers and a network.

The foregoing description suggests several possible architectures for a server/network combination. FIG. 7 shows an server/network architecture 700 comprising; a source server 701 connected to the ports 1-9 of a network 702 via a group of connections 710. A sink server 703 is connected to the ports 11-19 of network 702 via group of connections 711. The connections 710 and 711 may be unidirectional or bidirectional.

Although the ports 1-9 may be designated as "inputs", nevertheless signals—e.g., credits—and/or data may flow from the network 702 to the source server 701. Likewise ports 11-19 may be designated as "outputs", nevertheless signals—e.g., queue status information—and/or data may flow from the sink server 703 to the network 702.

The network 702 may be similar to the network 100 with a layer of source switches, a layer of intermediate switches, and a layer of sink switches. However, the source switch functionality may be subsumed by the source server. Likewise, the sink switch functionality may be subsumed by the sink server. If both the sink switch and source switch functionality is absorbed by the servers 701, 703 then the network 702 may contain only intermediate switch functionality. The intermediate switch functionality may also be subsumed in a third "server".

Figure 8:
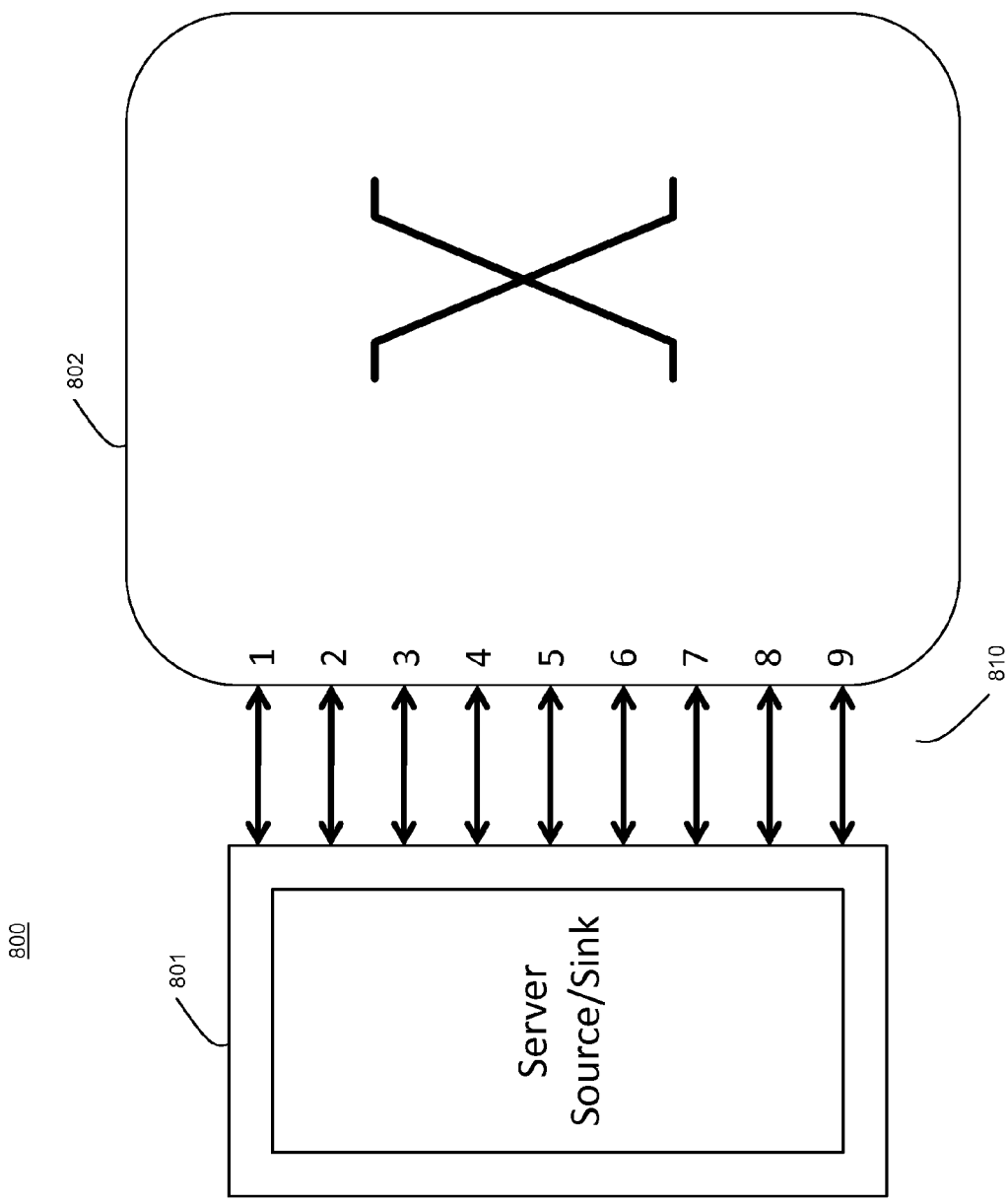
FIG. 8 shows an example architecture of a server and a network.

FIG. 8 shows another embodiment of the server/network architecture 800. The server Source/Sink 801 acts as both the source and the sink of the network 802. The server Source/Sink 801 is connected to the ports 1-9 of network 802 via a group of connections 810. The connections 810 may be unidirectional or bidirectional.

The network 802 may be similar to the network 100 with a layer of source switches, a layer of intermediate switches, and a layer of sink switches. However, the source switch and/or sink switch functionality may be subsumed by the server Source/Sink 801. If both the sink switch and source switch functionality is absorbed by the server Source/Sink 801 then the network 802 may contain only intermediate switch functionality. The intermediate switch functionality may also be subsumed in a third "server". Other architectures involving multiple layers of intermediate switch "servers" may be used in any suitable configuration.

Thus, methods and apparatus for improving the efficiency of a data transmission network are provided. Additionally reduced data loss and therefore improved transmission efficiency under fault conditions are also provided. Persons skilled in the art will appreciate that the present invention can be practiced by other than the described embodiments, which are presented for purposes of illustration rather than of limitation, and that the present invention is limited only by the claims that follow.

What is claimed is:

1. A network, comprising:
    a source switch comprising at least one input and at least two outputs;
    a plurality of sink switches each comprising at least one input and at least one output; and
    an intermediate switch coupled between the source switch and the plurality of sink switches, the intermediate switch configured to map at least one output of the intermediate switch to at least one accessible sink switch among the plurality of sink switches to generate an intermediate switch table; and share the intermediate switch table with the source switch, wherein the source switch receives a packet and transmits a first portion of the packet to at least one of the plurality of sink switches via a first of the at least two outputs of the source switch and transmits a second portion of the packet to the at least one of the plurality of sink switches via a second of the at least two outputs of the source switch.

2. The network of claim 1, wherein the source switch transmits the first portion of the packet and the second portion of the packet according to a load distribution algorithm.

3. The network of claim 1, wherein the at least one of the plurality of sink switches receives the first portion of the packet and the second portion of the packet and reorders the first portion of the packet and the second portion of the packet.

4. The network of claim 1, wherein:
the source switch comprises a virtual output queue;
the plurality of sink switches each comprise a scheduling mechanism;
the virtual output queue provides queue status information to at least one of the scheduling mechanisms; and
the at least one of the scheduling mechanisms generates a credit in response to reception of the queue status information.

5. The network of claim 4, wherein the at least one of the scheduling mechanisms generates the credit based on congestion in the network.

6. The network of claim 4, wherein:
the virtual output queue comprises a plurality of virtual output queues; and
the at least one of the scheduling mechanisms further generates the credit according to a priority scheme among the plurality of virtual output queues.

7. A network comprising:
a source switch comprising at least one input and at least two outputs; and
a plurality of sink switches each comprising at least one input and at least one output; and
an intermediate switch coupled between the source switch and the plurality of sink switches;
the source switch is configured to
receive a packet and transmit a first portion of the packet to at least one of the plurality of sink switches via a first of the at least two outputs of the source switch and transmit a second portion of the packet to the at least one of the plurality of sink switches via a second of the at least two outputs of the source switch;
receive an intermediate switch table generated by the intermediate switch mapping at least one output of the intermediate switch to at least one accessible sink switch among the plurality of sink switches;
generate a source switch table based on the received intermediate switch table by mapping the at least two outputs of the source switch to the at least one accessible sink switch; and
periodically update the source switch table.

8. The network of claim 1, wherein the source switch processes a packet header of the packet to produce a processed portion of the packet.

9. The network of claim 8, wherein the processed portion of the packet comprises a plurality of routing sections including a first routing section for the intermediate switch and a second routing section for the sink switch.

10. A source switch comprising:
circuitry configured to
receive a first table generated and shared by an intermediate switch coupled between the source switch and a plurality of sink switches by mapping at least one output of the intermediate switch to at least one sink switch among the plurality of sink switches;
generate a second table by mapping a plurality of outputs of the source switch to the at least one accessible sink switch;
receive a packet;
transmit a first portion of the packet to at least one of the plurality of sink switches via a first of the plurality of outputs of the source switch; and
transmit a second portion of the packet to the at least one of the plurality of sink switches via a second of the plurality of outputs of the source switch.

11. The source switch of claim 10, wherein the circuitry is configured to periodically update the second table.

12. The source switch of claim 10, wherein the circuitry is configured to transmit the first portion of the packet and the second portion of the packet according to a load distribution algorithm.

13. The source switch of claim 10, further comprising:
a virtual output queue, wherein
the circuitry is configured to provide queue status information corresponding to the virtual output queue to at least one scheduling mechanism included in at least one of the plurality of sink switches.

14. The source switch of claim 10, further comprising:
a plurality of virtual output queues, wherein
the circuitry is configured to provide queue status information corresponding to the plurality of virtual output queues to at least one scheduling mechanism included in at least one of the plurality of sink switches.

15. The source switch of claim 10, wherein the circuitry is configured to process a packet header of the packet to produce a processed portion of the packet.

16. The source switch of claim 15, wherein the processed portion of the packet comprises a plurality of routing sections including a first routing section for an intermediate switch and a second routing section for the at least one of the plurality of sink switches.

17. The network of claim 7, wherein the source switch transmits the first portion of the packet and the second portion of the packet according to a load distribution algorithm.

18. The network of claim 7, wherein the at least one of the plurality of sink switches receives the first portion of the packet and the second portion of the packet and reorders the first portion of the packet and the second portion of the packet.

19. The network of claim 7, wherein:
the source switch comprises a virtual output queue;
the plurality of sink switches each comprise a scheduling mechanism;
the virtual output queue provides queue status information to at least one of the scheduling mechanisms; and
the at least one of the scheduling mechanisms generates a credit in response to reception of the queue status information.

20. The network of claim 19, wherein the at least one of the scheduling mechanisms generates the credit based on congestion in the network.

* * * * *